April 19, 1927.
J. R. MEYERS
1,625,129
APPARATUS FOR PRESSING CHEESE
Filed Aug. 1, 1921
4 Sheets-Sheet 1
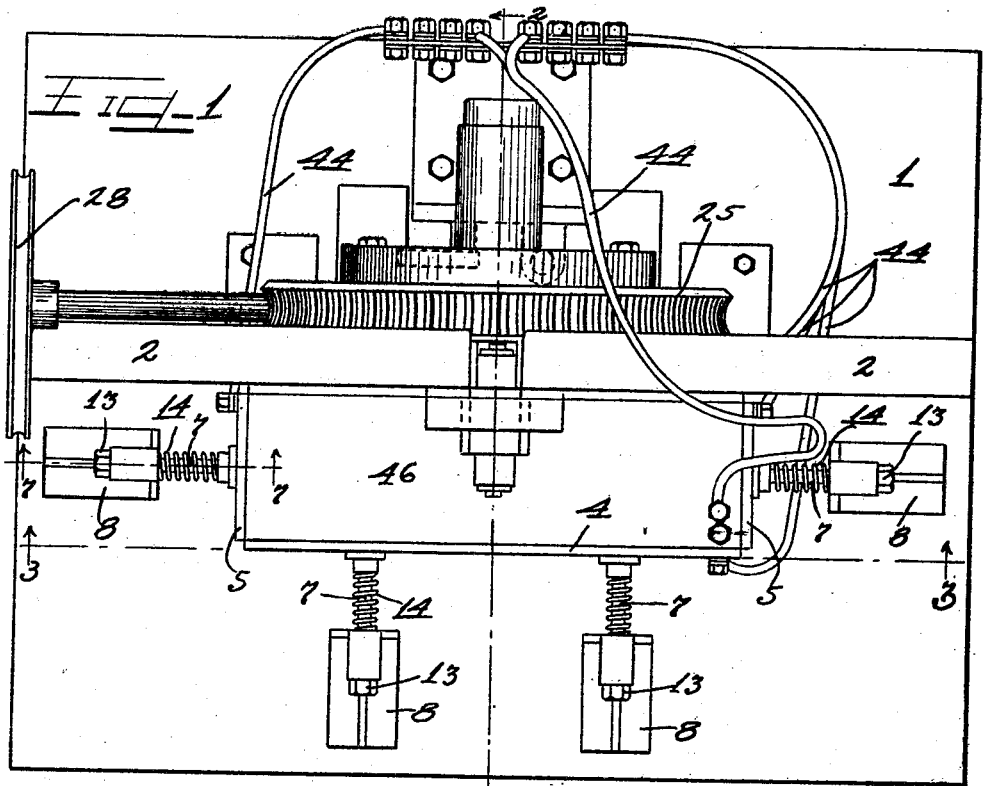
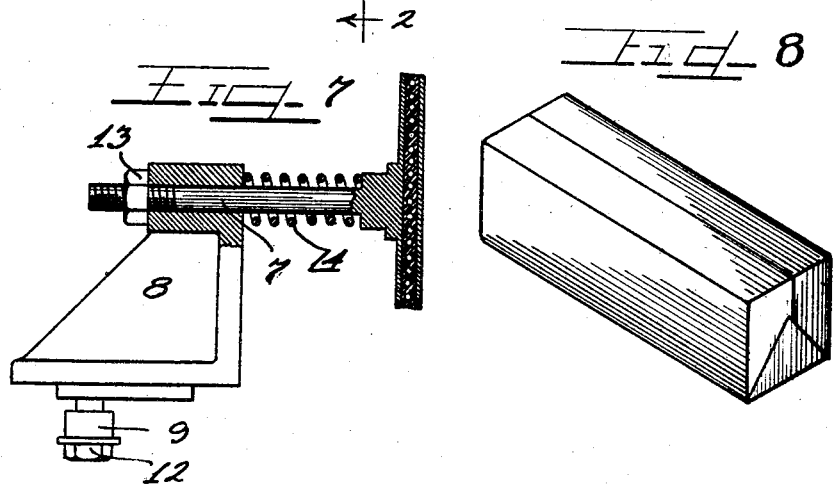
Inventor
JULIUS R. MEYERS

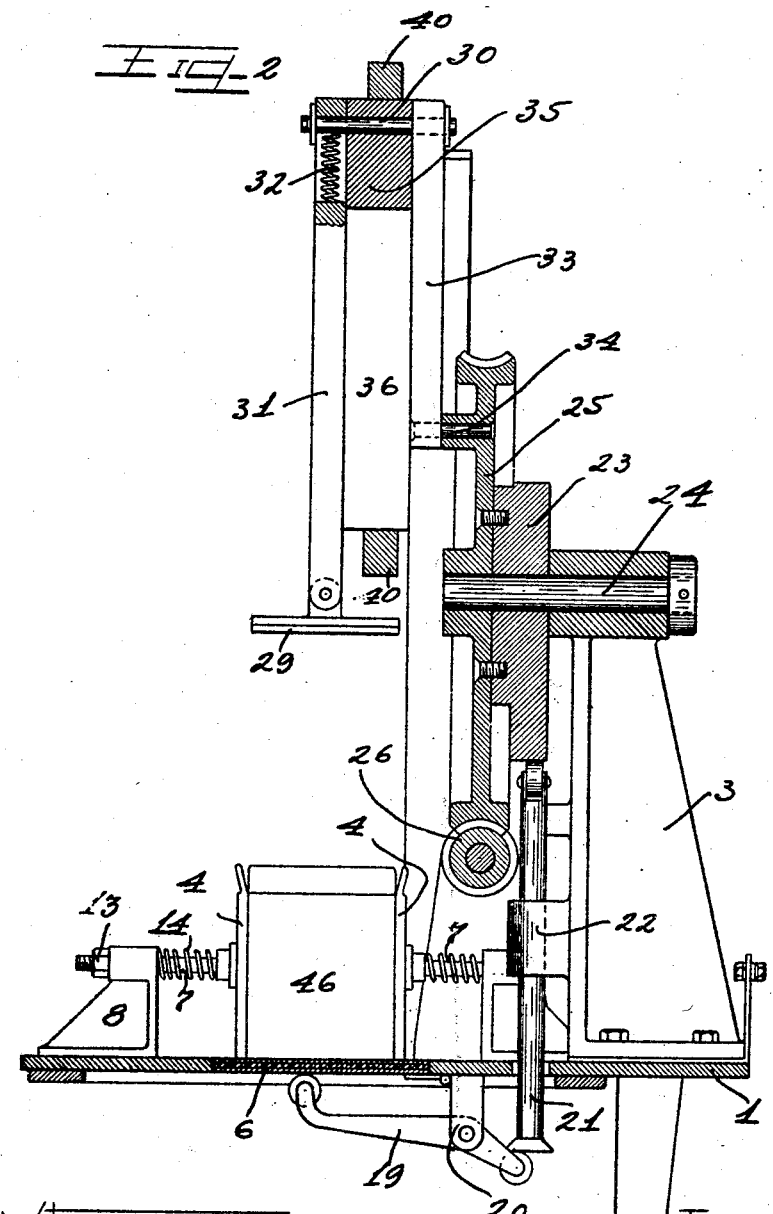

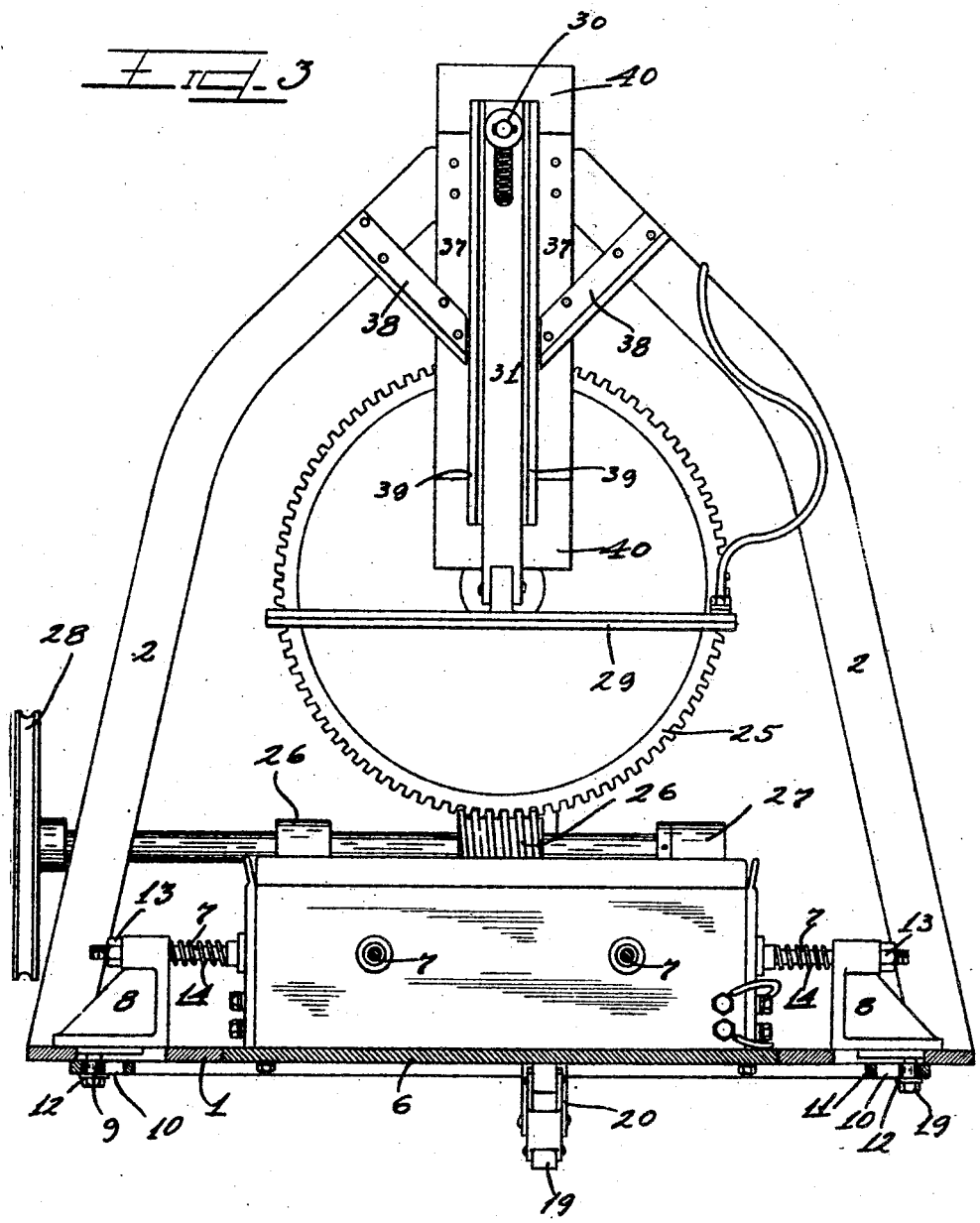

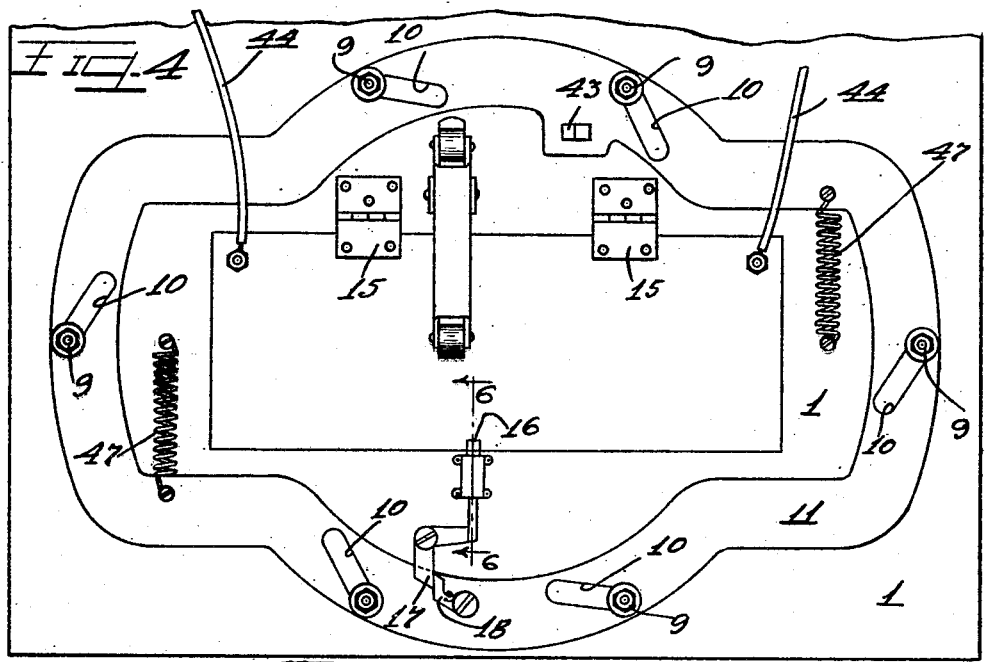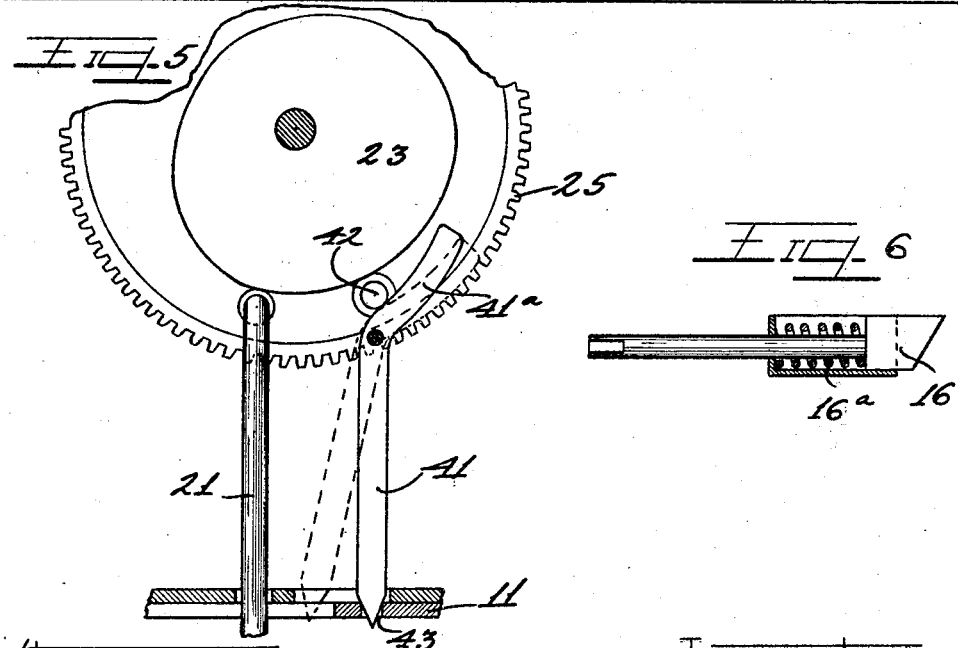

Patented Apr. 19, 1927.

1,625,129

UNITED STATES PATENT OFFICE.

JULIUS R. MEYERS, OF EVANSTON, ILLINOIS, ASSIGNOR OF ONE-HALF TO C. A. STRAUBEL COMPANY, OF GREEN BAY, WISCONSIN, A CORPORATION OF WISCONSIN.

APPARATUS FOR PRESSING CHEESE.

Application filed August 1, 1921. Serial No. 488,869.

This invention relates to an apparatus and process for treating cheese.

It is an object of this invention to provide a press that presses a block of wrapped cheese from all sides with provision for applying heat to the press while the cheese is under compression and thus fuse the surface thereof to a protective coating of tin foil or the like which will act as a rind about the cheese preserving it and preventing shrinkage, as well as protecting the same from dirt and the action of the air, as set forth in my co-pending applications for patent relating to "process of cheese packing", Serial Nos. 463,166 and 465,900.

It is pointed out in the co-pending applications referred to that heretofore in making individual blocks of cheese for sale upon the market, it has been the custom to initially place curds within a large press or mold, and then for a period of from eight to twelve hours gradually or from time to time increase the pressure thereof to press out the whey, and thereby form a large green cheese. This green cheese is then removed from the press or mold and cut into a plurality of pieces to form small blocks. These small blocks of cheese are then placed in smaller molds and again pressed in order to properly form them. Afterwards the curing process is completed. It will be obvious that by this process a rind is formed around each of the individual blocks, thus causing considerable waste in the cheese block.

The apparatus and process disclosed in this application was invented by me to afford means for effectively fusing the tin foil or other protective coating to the six sides of a block of cheese, so effectively that the individual blocks of cheese will be covered with a protective coating of tin foil or other suitable material which will act as a rind about the cheese, preserving and preventing shrinkage, as well as protecting the same from dirt and the action of the air, and still be such as can be readily cut through or removed when the cheese is ready to be used, leaving the cheese in a condition to be entirely consumed and without any of the waste or loss resulting from the usual rind.

It is a further object of this invention to provide a practical apparatus for carrying out my process for treating the cheese, as briefly set forth above.

With these and other objects in view which will become more apparent in the following description and disclosures in the drawing, my invention comprises the novel features of construction and combinations hereinafter described and more specifically pointed out in the appended claims.

In the accompanying drawings, which illustrate a preferred embodiment of my invention in which similar reference numerals refer to similar features in the different views:

Figure 1 is a top plan view of my apparatus.

Figure 2 is a section on the line 2—2 of Figure 1.

Figure 3 is a section on the line 3—3 of Figure 1 showing parts in elevation.

Figure 4 is a bottom plan view.

Figure 5 is a fragmentary detail view illustrating certain features.

Figure 6 is a section on the line 6—6 of Figure 4, showing the latch.

Figure 7 is a section on the line 7—7 of Figure 1.

Figure 8 illustrates the finished product.

As shown on the drawings:

Referring now to the different figures of the drawing which illustrates one embodiment of my invention, it will be noted that I have provided a supporting platform 1 from which rise a pair of standards 2 and a shaft bearing standard 3. The platform 1 forms the support for the cheese press which comprises the adjustable and yieldable sides 4, adjustable and yieldable ends 5 and bottom 6 which is in the form of a door leading through the platform.

While the sides and ends of the press may be variously supported and adjusted, I have illustrated a simple method which consists in providing screw threaded rods 7 or the like on the sides and ends of the press and providing slidable stools 8 having bearing apertures for receiving the rods, and depending heads 9 fitting in cam slots 10 in an adjustable ring member 11 (see Fig. 4), the heads 9 being provided with annular shoulders 12 to overlap the slots and hold the adjustable ring member in place. The stool members 8 are freely slidable on the rods 7, but are constrained in one direction by the nuts 13 and in the other direction by the yieldable springs 14. It is therefore obvious that as the stools 8 are drawn toward each other, they will act against yieldable abutments which will yield under too excessive strain.

The bottom of the press is formed by a door member 6 secured to the base 1 by the hinges 15 and the outwardly operated latch 16 which is operated by the bell crank latch bar 17 and the lug 18 during adjustment of the ring 11 for withdrawing the latch from latching position, a spring 16ª (Fig. 6) acting to automatically return the latch to latching position after the door has been closed by the lever 19 which is secured on the bracket 20 depending from the bottom of the platform 1, the lever 19 being periodically operated by a cam rod 21 slidably supported in a hollow bearing bracket 22 projecting from the inner side of the standard 3. And the cam rod is operated by a cam 23 journalled on a shaft 24 rotatably mounted in a bearing on the bracket 3. The cam is rotated by a worm gear 25 journalled on said shaft 24 adjacent the cam and secured thereto to provide an operatively integral structure. The worm gear 25 is rotated by means of the worm 26 supported in the bearing standards 27 fastened on the base 1, the worm shaft being provided with an operating means such as a pulley 28.

The downward pressure upon the cheese is effected in the present instance by a reciprocating compression head 29 yieldingly supported on a pivot pin 30 by means of a link 31 pivoted thereto and which is provided with a slot at its upper end for receiving the pin 30 and also a compression spring 32 which abuts against the rod to provide a yielding abutment for the compression head 29. For the purpose of reciprocating the head 29, the pin 30 is connected to a pitman 33 pivoted to a wrist pin 34 on the worm gear 25, the pin 30 being constrained to reciprocate in a straight line by means of a guide block 35 through which the pin extends, the guide block reciprocating in a guide groove 36 formed by plates 37 secured to the standards 2 in spaced relation by any means such as bolts and bracing bracket 38. The inner sides of the plates may be lined with smooth bearing liners 39, and the ends of the guide groove may be closed by the channel shaped members 40 secured to plates 37 in any approved manner. It is obvious that as the wrist pin 34 on worm gear 25 is carried around dragging the link or pitman 33 therewith, the guide block 35 will reciprocate in the guide groove and lower and raise the compression head 29, which on the lower limits of its travel will come into contact with a block of cheese in the press and compress the same slightly.

When the vertical compression of the cheese is effected by the compression head 29, it is also desirable that the lateral and end compressions be effected, and to this end I have devised means for adjusting the ring member 11 for simultaneously shifting the stool members 8 to cause the sides and ends of the press to compress the cheese when the vertical compression is being effected. The illustrated means for accomplishing this purpose comprises a lever 41 (see Fig. 5) pivoted intermediate its ends to the standard 3. The power arm 41ª of the lever 41 on that portion above the pivot is inclined so that as it is struck and shifted as shown in dotted line position by the pin or abutment 42 on the worm gear 25, it will have a gradual movement. The lower arm of the lever 41 extends through a slot in the base and engages in a slot 43 in the adjustable ring member 11.

It is obvious that as the worm gear 25 strikes and shifts the lever 41, the ring member 11 will be shifted so that the head 9 on the stools 8 will be drawn into the opposite ends of the slots 10 causing the sides and ends of the press to respectively approach each other, thus exerting pressure on the cheese from all sides.

It is an important feature of my invention to apply heat to the cheese while it is being compressed for fusing the outer surface thereof, and while the press may be heated in various ways, for the purpose of this invention, I have illustrated electrical heating means. Accordingly the interior part of the walls of the press, the compression head and bottom are made of insulating material (see Fig. 7) in which are embedded high resistance conductors which are adapted to be connected with a suitable electric circuit. In the different figures, I have illustrated the wires 44 leading to and from the walls, the bottom and the compression head for supplying the current for heating all six sides of the press.

After the cheese has been sufficiently compressed and heated to fuse the outer surface, the door 6 is automatically opened and the block of cheese drops upon a conveyor 45 which is in the form of a belt supported on a roller sustained by a bracket from the base 1.

The operation is as follows:

The operation of my apparatus is as follows: A block of cheese 46 which has been first wrapped in tin foil or any other suitable wrapper which will be impervious to moisture or the atmosphere, is placed into the press when the parts are in the position shown in the drawings, assuming that the current has been turned on to heat all the parts of the press, the power is then applied for rotating the worm gear and eccentric. The rotation of these parts will cause the compression head 29 to descend upon the block of cheese in the press and compress the same, and at substantially the same time the pin 42 will strike and shift lever 41 for shifting ring member 11 to apply pressure to the sides and ends of the press. The shifting of the ring member 11 will cause the latch lever operating lug 18 to swing the latch lever 17 for withdrawing the latch 16, allowing the door to swing downwardly so that the block of cheese can freely fall therethrough when the pressure is sufficiently released from the sides and ends of the press.

When the cam returns to its initial or starting position, as shown in the drawings, it will strike and depress the rod 21 which will swing the lever 19 for automatically closing the door 6 of the press as is obvious and the springs 47 connecting the ring member 11 and base 1 will return the ring member and lever 41 to normal inoperative position.

As will be seen from the foregoing, my invention in its broadest aspect comprises an apparatus and process for completing the compression of the cheese and simultaneously heating the sides of the same which have been previously wrapped in tin foil or other suitable coating and thereby effect a firm adhesion of the wrapper to the cheese to prevent the formation of a rind on the surface of the wrapped cheese. It has been my experience that where cheese is wrapped and treated by the use of this apparatus and process, there has been no waste, and that the entire block of cheese is edible. It is a characteristic of the cheese so wrapped that it can be clearly cut, avoiding tearing of the covering, such as has occurred in the past where the cheese has been merely wrapped with a coating of tin foil without bonding the same by fusion.

It will, of course, be obvious that the disclosure of this apparatus and process will enable others skilled in the art to devise means for heating the sides of the wrapped cheese to fuse the cheese to the wrapping, and the numerous details of construction may be varied through a wide range without departing from the principles of this invention. I therefore do not purpose limiting the patent granted otherwise than necessitated by the prior art.

I claim as my invention:

1. A press comprising yieldably supported walls having depending lugs, a shiftable device engaging said lugs, a compression head for the press, and means for simultaneously operating said head and shiftable device.

2. In a press, a compression head, a gear for operating said head, a hinged door forming the bottom of said press, and means operated by said gear for closing the door.

3. In a press, a plurality of adjustable walls, a swinging bottom, a device for latching said bottom, and a ring member for simultaneously adjusting said walls and unlatching said swinging bottom.

4. A press comprising a swinging bottom, adjustable sides, a reciprocating compression head, a rotary device for reciprocating said head, and means operated by said rotary device in one position of its movement for swinging said bottom to closed position, and means operated by said device in another position of movement for shifting said sides and unlatching said swinging bottom.

5. In a press, a plurality of yieldable and adjustable walls having depending lugs, a ring member having inclined slots engaging said lugs, and means for shifting said ring member for simultaneously expanding or contracting said walls.

6. In a press, a plurality of adjustable walls having depending lugs, a ring member having inclined slots for receiving said studs, a compression head, electrical resistance means for heating said walls, and operating mechanism for reciprocating said head and shifting said ring member.

7. In a press, a plurality of adjustable and heated elements adapted for compressing the cheese, a compression head adapted for reciprocation between said elements, a swingable bottom for the press, and operating mechanism for reciprocating said head, adjusting said elements and controlling said swingable bottom.

In testimony whereof I have hereunto subscribed by name.

JULIUS R. MEYERS.